US006799118B2

(12) United States Patent
MacKay

(10) Patent No.: US 6,799,118 B2
(45) Date of Patent: Sep. 28, 2004

(54) DYNAMIC WATER VELOCITY CORRECTION

(75) Inventor: Scott MacKay, Englewood, CO (US)

(73) Assignee: WesternGeco L.L.C., Houston, TX (US)

(*) Notice: Subject to any disclaimer, the term of this patent is extended or adjusted under 35 U.S.C. 154(b) by 55 days.

(21) Appl. No.: 09/981,226

(22) Filed: Oct. 17, 2001

(65) Prior Publication Data

US 2003/0074140 A1 Apr. 17, 2003

(51) Int. Cl.[7] ................................................ G01V 1/00
(52) U.S. Cl. ............................................ 702/16; 703/10
(58) Field of Search ......................... 702/12, 16; 367/24, 367/21, 38, 53; 703/10

(56) References Cited

U.S. PATENT DOCUMENTS

| | | | | |
|---|---|---|---|---|
| 4,577,297 A | * | 3/1986 | Kalkomey et al. | 367/24 |
| 4,695,984 A | | 9/1987 | Paal | 367/54 |
| 4,839,869 A | * | 6/1989 | Corcoran | 367/53 |
| 4,935,903 A | * | 6/1990 | Sanders et al. | 367/24 |
| 4,992,993 A | * | 2/1991 | Chambers | 367/21 |
| 5,532,976 A | * | 7/1996 | Schneider, Jr. | 367/38 |

FOREIGN PATENT DOCUMENTS

GB     2081446 A     2/1982

OTHER PUBLICATIONS

Brian Barley; *Deepwater problems around the world*, The Leading Edge, Apr. 1999, pp 488–494, 26 Figs.
Eric de Bazelaire et al.; *Normal moveout in focus*, XP 00061755, Geophysical Prospecting, 1994, 42, pp. 477–499, 13 Figs.
John R. Berryhill; *Wave–equation datuming before stack*, Geophysics, vol. 49, No. 11, Nov. 1984, pp. 2064–2066, 4 Figs.
John R. Berryhill; *Submarine canyons: Velocity replacement by wave–equation datuming before stack*, Geophysics, vol. 51, No. 8, Aug. 1986, pp. 1572–1579, 7 Figs.
Richard Wombell: *Water velocity variations in 3D seismic processing*, 66th Annual International Meeting: Soc. of Expl. Geophysics, 1996, pp. 1666–1669, 3 Figs.
Walt Lynn et al.; *Efficient migration through complex water–bottom topography*, Geophysics, vol. 58, No. 3, Mar. 1993, pp. 393–398, 9 Figs.

* cited by examiner

*Primary Examiner*—John Barlow
*Assistant Examiner*—Victor J. Taylor
(74) *Attorney, Agent, or Firm*—Madan, Mossman & Sriram, P.C.

(57) ABSTRACT

This invention removes the effects of variable water velocity by calculating and applying corrections that map the seismic data to an ideal case of constant water velocity. All of the corrections assume, from a separate analysis step, that the vertical (zero-offset) timing errors induced by the water-velocity variations and that the zero-offset water bottom times are available. Equivalently, the water velocities are assumed known. The timing errors and water velocities are related. The zero-offset water-bottom times are also assumed available. From this information, and an arbitrarily-defined "ideal" water velocity, it is possible to calculate an observed (actual) water velocity relative to the "ideal" case. The only additional information needed is the angle of the ray path through the water layer. The angle may be calculated directly from normal moveout velocities derived from conventional analysis of the seismic data, and the information above. A time-dependent and offset-dependent correction may be derived for each sample of the seismic data prior to normal moveout correction.

26 Claims, 6 Drawing Sheets

Angle Dependence of Correction

DYNAMIC WATER VELOCITY CORRECTION

FIELD OF THE INVENTION

This invention relates to the field of geophysical prospecting and, more particularly, to a method to calculate and apply a time correction to correct for propagation through the variable velocity in the water layer.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal which propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

One of the problems arising in acquiring and processing 3D seismic data in the some marine areas is that of variable water velocity creating inconsistent traveltimes between sources and receivers. As a result of the interaction between warm and cold currents, the water velocity may vary relatively rapidly, both temporally and spatially. In such areas, these velocity variations may be large enough to have a detrimental effect on subsequent data processing.

Water velocity can be related to the water temperature, salinity and depth. The velocity of compressional waves in water has been modeled as [Sheriff, Encyclopedic Dictionary of Exploration Geophysics, 3$^{rd}$ Ed., 1991]:

$$V=1449.2+4.6T-0.055T^2+0.0003T^3+(1.34-0.010T)(S-35)+0.0162Z$$

where V is the velocity in meters per second, T the temperature in degrees Celsius, S the salinity in parts per thousand and the depth below the water surface, Z, is in meters. As bodies of water having differing temperatures meet, there can be different degrees of mixing and the location of the 'front' between the bodies of water can move significantly over short periods of time. This means that the structure of the water column and hence the water velocity structure can change significantly over relatively short distances and times.

These water velocity changes have implications for seismic processing. For a typical 3D acquisition scenario, the water velocity will vary along the length of a sail-line. In some situations it is possible to identify and track reflections from interfaces between the warm and cold layers of water along the length of a sail-line. Water velocity changes over distances of less length of the acquisition cable may effect the acquisition. However, the primary effect is usually between adjacent sail-lines. Depending upon the acquisition timetable, adjacent or areally coincident sail-lines may be shot hours, days or even weeks apart, so although two lines may be physically close to one another they can be widely separated in time, possibly resulting in datasets with significant water velocity differences. Water velocity differences will result in dynamic differences between data in the combined datasets and these change may effect the data processing, in particular processes like multiple attenuation, DMO, stacking and 3D migration.

Without an independent measurement, the prior art methods have usually estimated the water velocity from the seismic data itself. Direct arrivals are not useful since they travel only through shallow water and often do not have sufficient information to determine the actual depth to velocity profile. Water velocity will generally increase with depth. As water depths increase the effects of water currents become stronger. If there is no direct measurement of the water depth, the water bottom time cannot be used to compute the water velocity. If there are no significant velocity changes within the acquisition spread length, a stacking or RMS velocity may be estimated from shot records or CMP gathers. Also, tomographic or wave-equation based inversion techniques might be used to invert for a depth (and perhaps, spatially) varying velocity function.

One prior art approach for water velocity determination has been to derive an estimate from the stacking velocity. This method assumes that the water velocity is constant, or varies only with depth, giving approximately hyperbolic moveout and lateral variations in the velocity may be ignored. This calculation is restricted to near offsets so as to be unaffected by refracted events. A local average water velocity may be estimated in this manner.

Changes in the water velocity resulting in dynamic differences in the combined seismic data may often be large enough to effect data processing and subsequent imaging. For 2D processing or within each sail-line the effect may not be particularly dramatic since the velocity changes can be relatively smooth and continuous along the acquisition spread. However for 3D processing, where temporally different but areally coincident or adjacent data are combined, the water velocity may change discontinuously. The data may appear to contain discontinuities or 'busts' in, for example, the crossline direction of adjacent sail-lines.

Detrimental effects upon subsequent processing due to apparent static problems will occur if these problems are not remedied. For example, 3D DMO will not function adequately and smear artifacts will be problematic. The 3D migration will produce artifacts at all azimuths from the edge of each bust. Many 3D pre-stack data processes may be compromised.

Water velocity changes on seismic data records are dynamic and the cost of applying a proper correction, for example through a wave-equation redatuming approach, may be computationally expensive. One prior art method has been to apply a static correction. For a flat water bottom and a depth independent water velocity, the change in the water bottom arrival time, $\Delta t_w$, due to a change in water velocity, $\Delta V_w$, is straightforward to calculate:

$$\Delta t_w = t_w (\Delta V_w / V_w)$$

This calculation can be used to compute a static correction to compensate for a change in the water velocity by computing a static for the zero-offset case and applying it after normal moveout has been applied to the data. As the correction is accurate only for the zero-offset case, slanted ray paths will not be accounted for accurately.

The water velocity and water bottom zero-offset time may be computed along the length of each sail-line and then used to generate the static correction described above, correcting the data assuming a change in the water velocity from a reference velocity. These corrections vary continuously along each sail-line, but are discontinuous across sail-line boundaries or between areally coincident datasets acquired separately in time. The static corrections may then be applied to the data after applying NMO.

Oceanographic conditions can effect the water velocity over relatively short time spans and/or small spatial distances. Because areally adjacent or coincident data may be acquired at different times, giving time for the water velocity to change, discontinuities may occur which can seriously effect later processing. Prior art methods only partially compensate for temporally changing water velocities that affect acquisition. It would be advantageous to have an efficient correction for dynamically changing water velocities in marine data acquisition that accounts for slanted ray paths.

SUMMARY OF THE INVENTION

The invention is a method of deriving a velocity correction for seismic data processing to correct for the effects of variable water velocities. A zero-offset static correction is determined for the seismic data that is the difference between an observed time to a water bottom and an ideal time to a water bottom determined using a selected ideal velocity. An ideal water velocity is selected for the seismic data. A zero-offset water bottom time is determined for the seismic data. An observed velocity is determined for the seismic data. A dynamic water velocity correction is computed and applied to the seismic data for varying offsets and raypaths.

BRIEF DESCRIPTION OF THE DRAWINGS

The present invention and its advantages will be better understood by referring to the following detailed description and the attached drawings in which.

Figure 1:
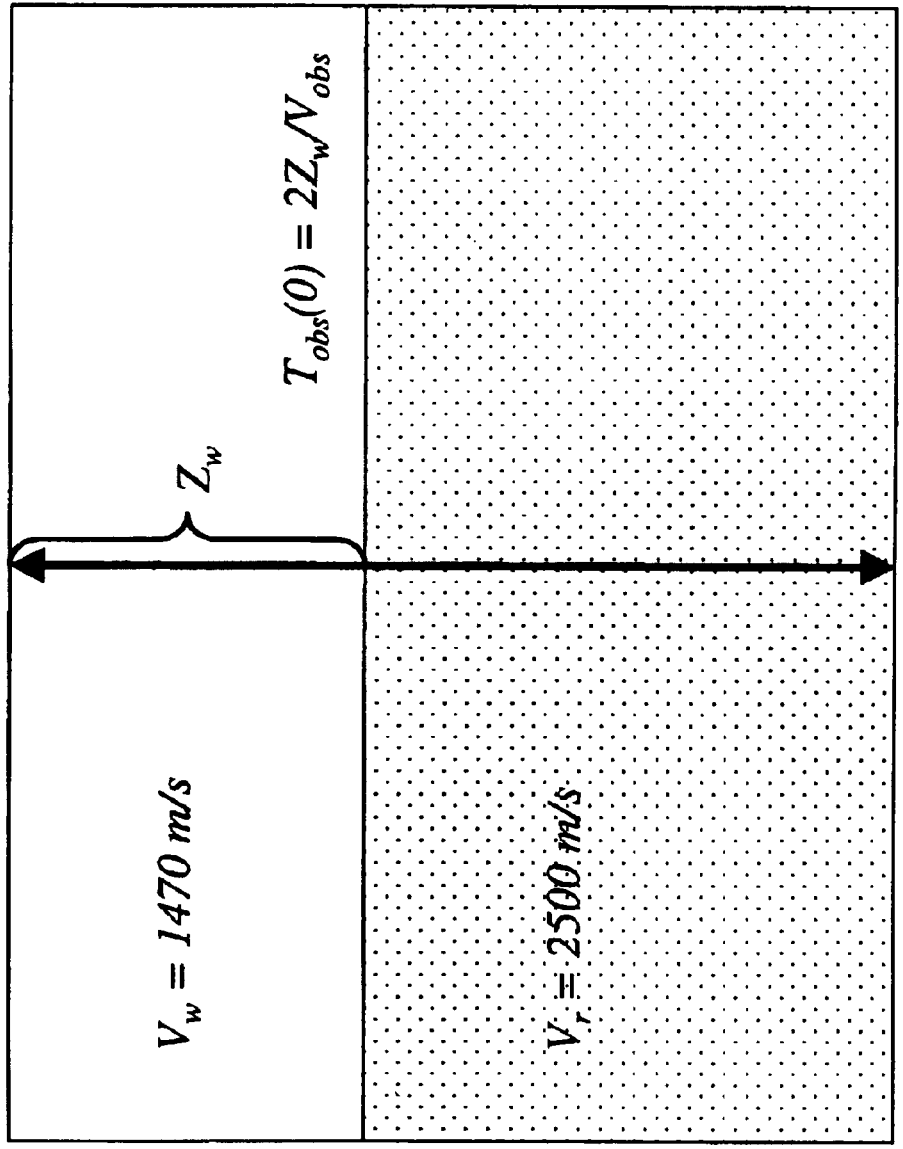
FIG. 1 illustrates an earth model of observed values to map to the ideal case.

While the invention will be described in connection with its preferred embodiments, it will be understood that the invention is not limited thereto. On the contrary, it is intended to cover all alternatives, modifications, and equivalents that may be included within the spirit and scope of the invention, as defined by the appended claims.

DETAILED DESCRIPTION OF PREFERRED EMBODIMENTS

The present invention is a method for correcting seismic data problems that arise due to variable water velocities in the marine data acquisition. In certain embodiments corrections are calculated and applied such that corrections map the seismic data to an ideal case of constant water velocity. Other advantages of the invention will be readily apparent to persons skilled in the art based on the following detailed description. To the extent that the following detailed description is specific to particular embodiments or a particular use of the invention, this is intended to be illustrative and is not to be construed as limiting the scope of the invention.

This invention may be implemented by a computer program for seismic data processing to address problems encountered during marine seismic data acquisition. It is common during marine data acquisition that deficiencies occur in areal seismic coverage. These deficiencies are addressed by acquiring in-fill data at a later time. However, during this time between data acquisition, physical changes in the ocean, such as temperature or salinity cause velocity differences, resulting in dynamic changes in recorded traveltimes that prevent accurate combination and imaging of the data.

This invention removes the effects of variable water velocity by calculating and applying corrections that map the seismic data to an ideal case of constant water velocity. All of the corrections assume, from a separate analysis step, that the vertical (zero-offset) timing errors induced by the water-velocity variations and that the zero-offset water bottom times are available. Equivalently, the water velocities are assumed known. The timing errors and water velocities are related by equation 5 below. The zero-offset water-bottom times are also assumed available. From this information, and an arbitrarily-defined "ideal" water velocity, it is possible to calculate an observed (actual) water velocity relative to the "ideal" case. The only additional information needed is the angle of the ray path through the water layer. The angle may be calculated directly from normal moveout velocities derived from conventional analysis of the seismic data, and the information above. A time-dependent and offset-dependent correction may be derived for each sample of the seismic data prior to normal move out correction.

To remove these dynamic traveltime differences, water-velocity measurements may be combined with stacking-velocity measurements to calculate and apply a dynamic time correction to correct for propagation through the variable velocity in the water layer. In preferred embodiments of this invention data are corrected to an arbitrary, "ideal" water velocities that account for both vertical and slanted ray paths through the water layer. To ensure stability and eliminate costly ray-trace solutions the angle of propagation through the water may be determined directly from the normal moveout of the data as derived from the stacking velocities.

Figure 2:
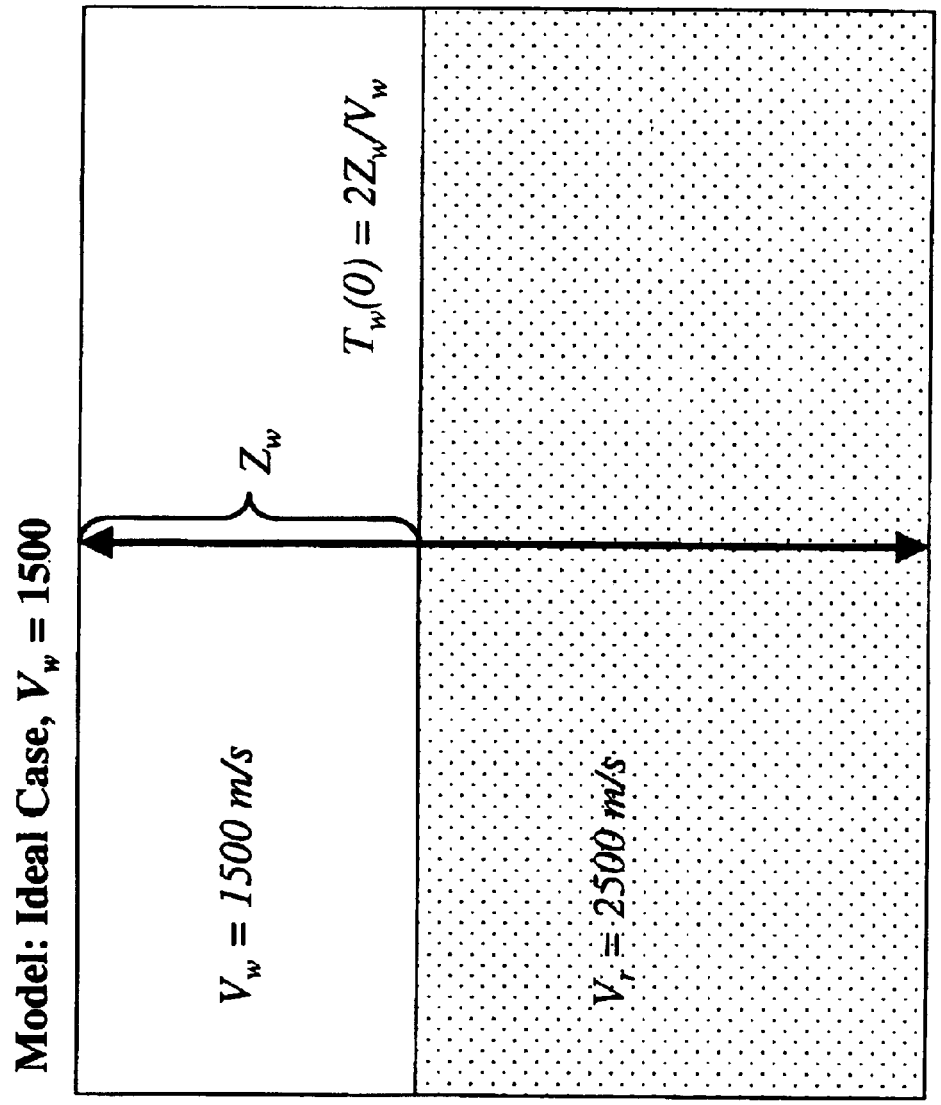
FIG. 2 illustrates an earth model of ideal values mapped from the observed case.

The method starts by deriving a correction that maps the observed case (FIG. 1) to the ideal case (FIG. 2).

$$T_w = 2Z_w/V_w \text{ (ideal)}, \quad (1)$$

$$T_{obs} = 2Z_w/V_{obs} \text{ (observed)}. \quad (2)$$

$T_w$ is the vertical, two-way traveltime to the water bottom, given an ideal water velocity, $V_w$, and a water depth of $Z_w$. $T_{obs}$ is the observed, vertical two-way traveltime to the water bottom, given an observed (actual) water velocity, $V_{obs}$. A vertical static correction, $\Delta t$, may be defined that is the difference between an observed time to a water bottom and an ideal time to a water bottom determined using a selected ideal velocity. From Lynn, MacKay, and Beasley, 1993, Efficient migration through complex water-bottom topography, *Geophysics*, Soc. Of Expl. Geophys., 58, 393-398, the vertical (zero-offset) time correction, $\Delta t$, is:

$$\Delta t = T_w - T_{obs} = 2Z_w(1/V_w - 1/V_{obs}), \quad (3)$$

$$\Delta t = T_{obs}(V_{obs}/V_w - 1). \quad (4)$$

The values of $\Delta t$ and $T_{obs}$ are assumed known and $V_w$ is the arbitrary, "ideal" velocity. $T_{obs}$ is a single value for a gather of any type being corrected. The vertical correction, $\Delta t$, may also be adjusted by quantifying the zero offset static shifts between sail lines of the survey. The vertical static defined in Equation 4 was also presented by Wombell in Water Velocity Variations In 3-D Seismic Processing, 66th Ann. Internat. Mtg: Soc. Of Expl. Geophys., 1996, 1666–1669. This vertical static may be applied after normal moveout correction with $V_{obs}$ used in the water layer. Solving Equation 4 for $V_{obs}$ yields:

$$V_{obs} = V_w(\Delta t/T_{obs} + 1) \qquad (5)$$

This yields $V_{obs}$ the observed water velocity. Whether $V_{obs}$ is determined by indirect methods (for example, from the difference between vertical time shifts) or direct methods (for example, moveout analysis), $V_{obs}$ is suitable for exact (dynamic) water velocity correction solutions, in addition to vertical water velocity corrections.

A target water bottom time and time shifts for traces may be determined separately. For each sail line target water bottom time (for example the model $T_w$) and time shift $\Delta t$, may be obtained. The time shift, $\Delta t$, and target water bottom, $T_w$, are combined to derive $V_{obs}$ relative to the ideal velocity $V_w$. $V_{obs}$ may then be constrained to be some percentage of the ideal velocity. $V_{obs}$ may then be smoothed and interpolated. Alternatively, if $\Delta t$ measurements are not used, the equivalent $V_{obs}$ may be supplied from other forms of analysis.

Figure 3:
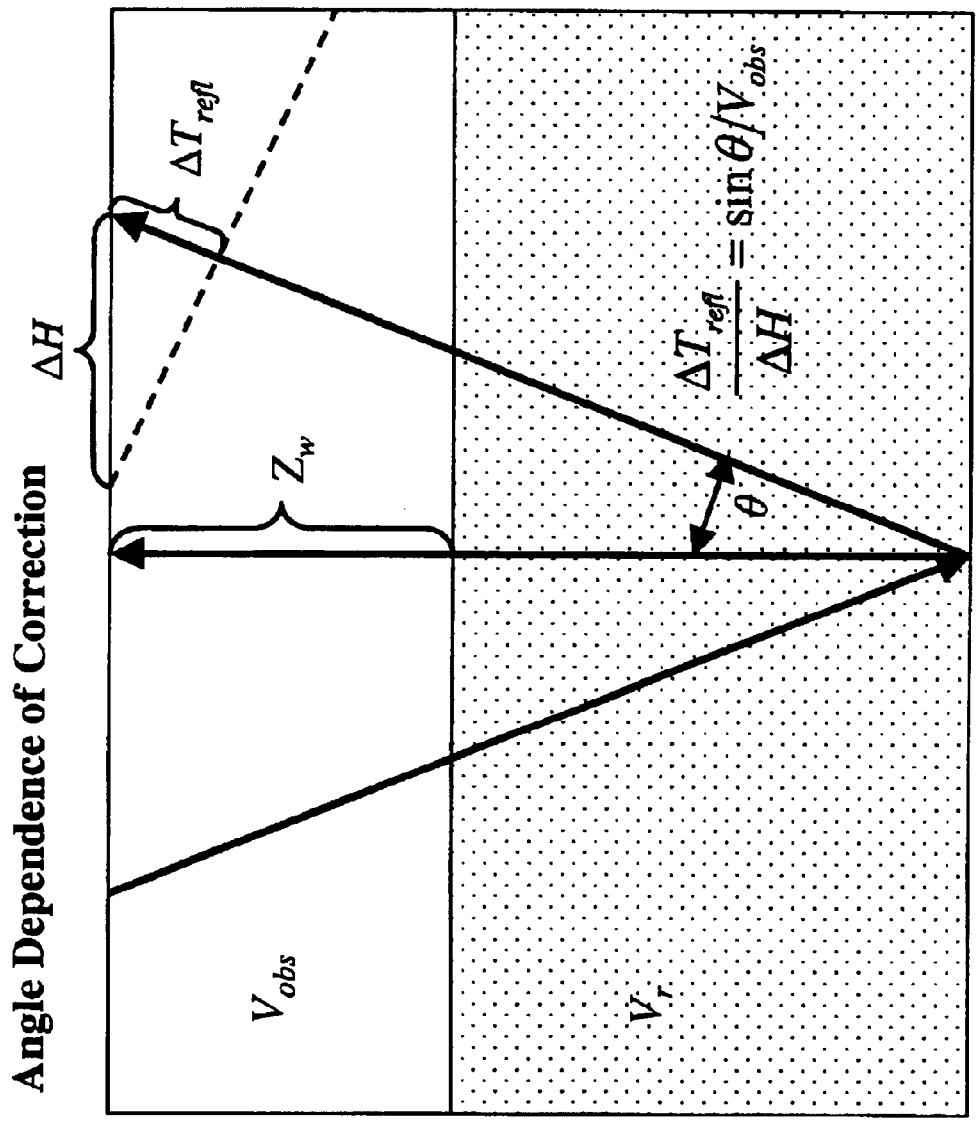
FIG. 3 illustrates the angle dependence for the corrections.

The problem with applying vertical corrections only (like $\Delta t$ of equation 4) is that rays arriving at the surface obliquely have a larger time correction due to a longer ray path (see FIG. 3 for geometry):

$$\Delta t(\theta) = \Delta t(\theta=0)/\cos\theta, \qquad (6)$$

where $\Delta t(\theta=0)$ represents the vertical correction. To derive an expression for the angle of the ray, $\theta$, recall that the observed normal moveout at the surface is (FIG. 3):

$$\Delta T_{refl}(H)/\Delta H = \sin\theta/V_{obs}, \qquad (7)$$

where H is full offset. $V_{obs}$ may computed as above in equation 5 or derived directly from velocity analysis. Combine with the normal moveout equation:

$$T_{refl}(H) = [(T_{refl}(H=0))^2 + H^2/V_{rms}^2]^{1/2}, \qquad (8)$$

where $T_{refl}(H=0)$ is the vertical two-way traveltime to the reflector. $V_{rms}$ is the stacking velocity determined from normal moveout analysis of seismic events and does not refer only to the water bottom reflector. Evaluating the derivative in Equation 7 using Equation 8 yields:

$$\Delta T_{refl}(H)/\Delta H = \sin\theta/V_{obs} = H/(T_{refl}(H)V_{rms}^2), \qquad (9)$$

or, $$\sin\theta = (V_{obs}H)/(T_{refl}(H)V_{rms}^2). \qquad (10)$$

Importantly, $\Delta T_{refl}(H)$ implies the observed traveltimes of all events as a function of full offset, H. In this manner, the arrival angle for each event is determined in a robust manner without the need for ray tracing through an interval velocity model, a typically costly and potentially unstable process.

Finally, assuming flat dip and straight rays, we can define a dynamic correction using the observed water bottom time and the zero-offset time correction in the form of $V_{obs}$:

$$\Delta t(\theta) = \Delta t(\text{vertical})/\cos\theta, \qquad (11)$$
$$= T_{obs}(V_{obs}/V_w - 1)/\cos\theta,$$
$$= T_{obs}(V_{obs}/V_w - 1)/(1 - \sin^2\theta)^{1/2},$$
$$= T_{obs}(V_{obs}/V_w - 1)/\{1 - [HV_{obs}/(T_{refl}(H)V_{rms}^2)]^2\}^{1/2},$$

or, in terms of the zero-offset correction:

$$\Delta t(\theta) = \Delta t(0)/\{1 - [HV_{obs}/(T_{refl}(H)V_{rms}^2)]^2\}^{1/2}. \qquad (12)$$

This dynamic correction allows for offset dependent corrections for all source-receiver offsets.

Figure 4:
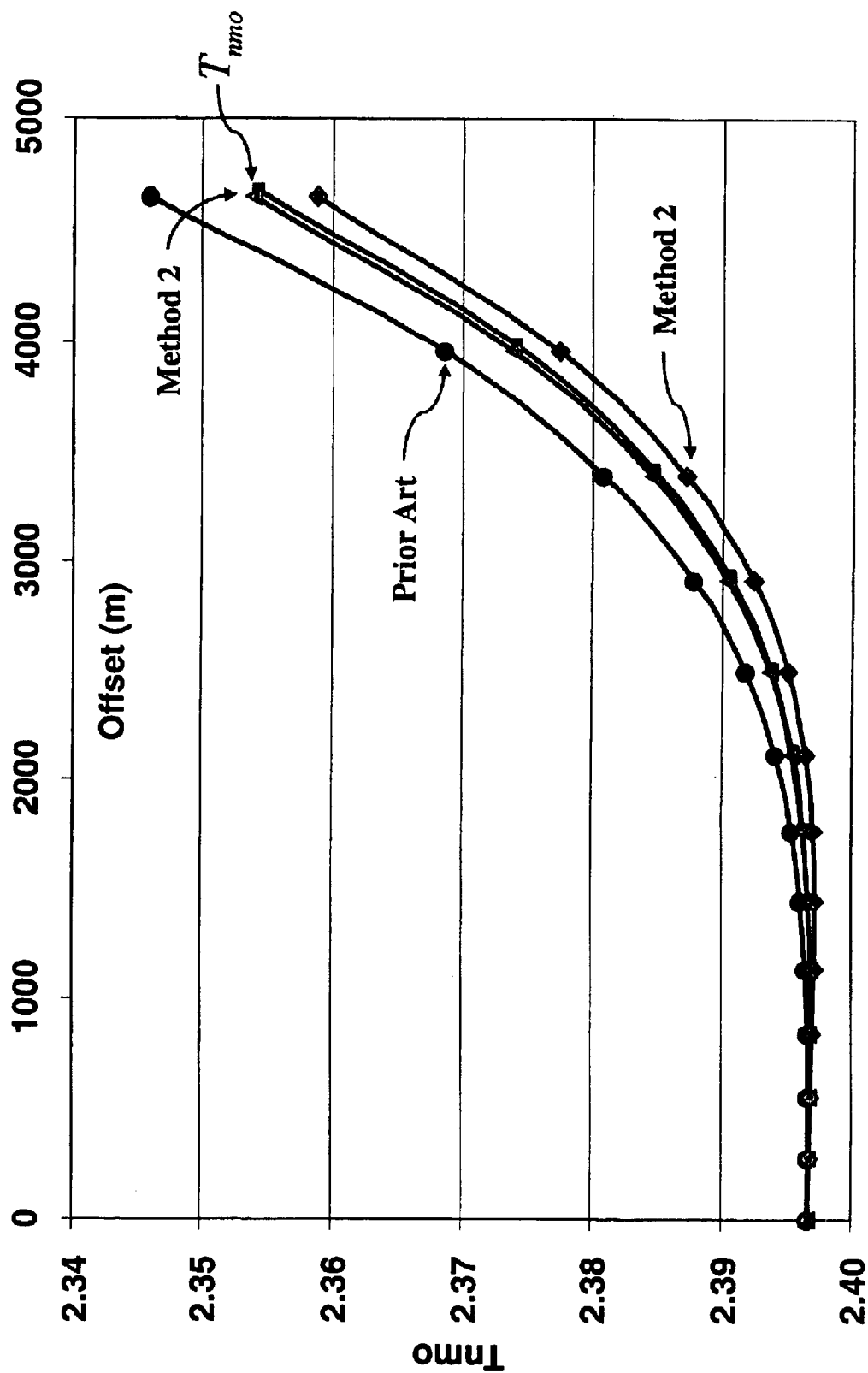
FIG. 4 illustrates a comparison of the ideal case, prior art and preferred embodiments of the present invention.

FIG. 4 shows the result of applying the invention to synthetic data. The data, as a common midpoint gather, were created using an exact ray-trace solution through a two-layer model. The model has a water depth of 1000 meters and a second, horizontal reflector at a depth of 2000 meters, with an interval velocity of 2500 m/s up to the water bottom. Ray-trace solutions from the deeper reflector are shown for two cases, the ideal case (with water velocity set to 1500 m/s) and the observed case (water velocity is 1470 m/s). The traveltimes shown correspond to the reflector at 2000 meters. The ideal case is used as a reference and the corrections are applied to the observed case.

The data for the ideal water velocity case (1500 m/s) are shown in FIG. 4 after normal moveout with the theoretical, two-layer RMS velocity down to the reflector at 2000 meters (1944.6 m/s) as squares (annotated $T_{nmo}$ ideal). Note that the data are horizontal out to an offset approximately equal to the depth of the event (2000 meters). This is taken to represent the optimal result; the upward curvature at greater offsets is expected due to the effects of ray bending that are not corrected by conventional, hyperbolic normal moveout correction. The prior art method of Wombell applies the zero-offset vertical correction after normal moveout with the two-layer RMS velocity containing $V_{obs}$ (yielding 1917 m/s). The results are shown in FIG. 4 as circles (annotated Prior Art).

In one preferred embodiment of the present invention the vertical correction, $\neq t(\theta=0)$, is applied before normal moveout. These results, after normal moveout using the two-layer RMS velocity containing $V_w$ in the water layer (1944.6 m/s) are shown as diamonds (annotated Method 2).

In another preferred embodiment the dynamic correction is applied before normal moveout, and is shown after normal moveout with the two-layer RMS velocity (1944.6 m/s) shown as triangles in FIG. 4 (annotated Method 1). Note that the dynamic correction defined by Equation 12 (triangles) yields a very close result to the ideal case ($T_{nmo}$ ideal as squares).

For any particular gather, for example shot, receiver or CMP gather, the information comes from a particular shot and is recorded at a particular receiver. The moveout (RMS) velocity for a gather is used to infer the arrival angle at the water surface. The arrival angle at (or from) a source location and receiver location may be used in calculating $T_{obs}$ by projecting both legs of the raypath to the water bottom (or water bottom model, for example $T_w$).

For each CMP, the stacking velocity may be replaced by the smoothed and interpolated $V_{obs}$ down to the water bottom ($T_{obs}$). The dynamic correction may then be calculated and applied prior to NMO. Subsequently, corrected velocity functions using $T_w$ and $V_w$ at the water bottom may be determined.

Figure 5:
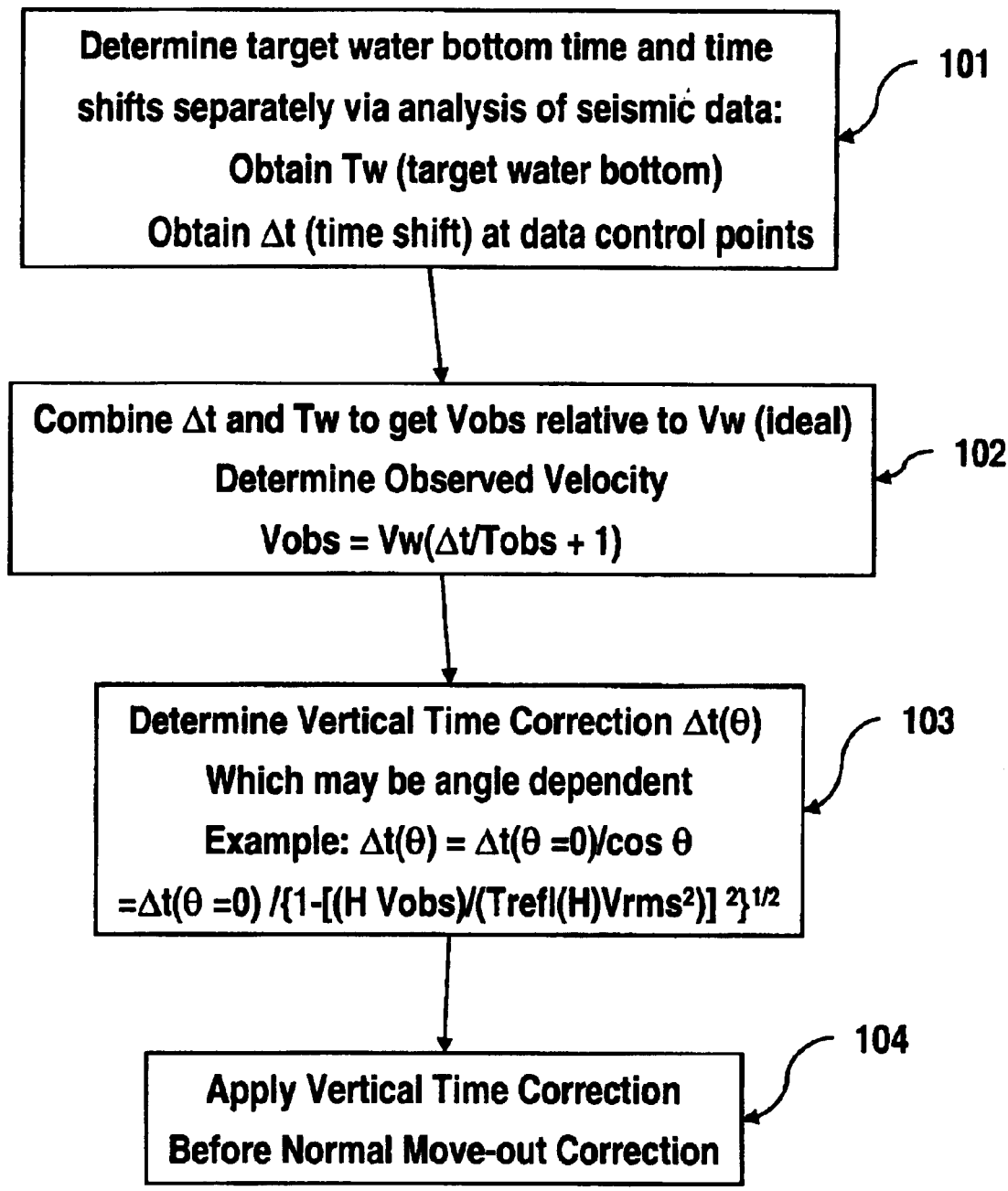
FIG. 5 illustrates a processing flowchart of the present invention.

FIG. 5 illustrates a flow chart of the present invention. A target water bottom time $T_w$ and a time shift are determined at various points in the dataset 101. A vertical static correction, $\Delta t$, may be defined that is the difference between an observed time to a water bottom and an ideal time to a water bottom determined using a selected ideal velocity. For each sail line target water bottom time $T_w$ and time shift $\Delta t$, may be obtained. The time shift, $\Delta t$, and target water bottom, $T_w$ are combined to derive $V_{obs}$ relative to the ideal velocity $T_w$ 102. $V_{obs}$ may then be constrained to be some percentage of the ideal velocity. $V_{obs}$ may then be smoothed and interpolated. Alternatively, if $\Delta t$ measurements are not used, the equivalent $V_{obs}$ may be supplied from other forms of analysis. A vertical time correction $\Delta t(\theta)=\Delta t(\theta=0)/\cos\theta$, is then determined 103 using $V_{obs}$. This vertical time correction may be angle dependent, for example using equation 12 above. In a preferred embodiment of the present invention, the vertical time correction is applied before the NMO correction 104.

Figure 6:
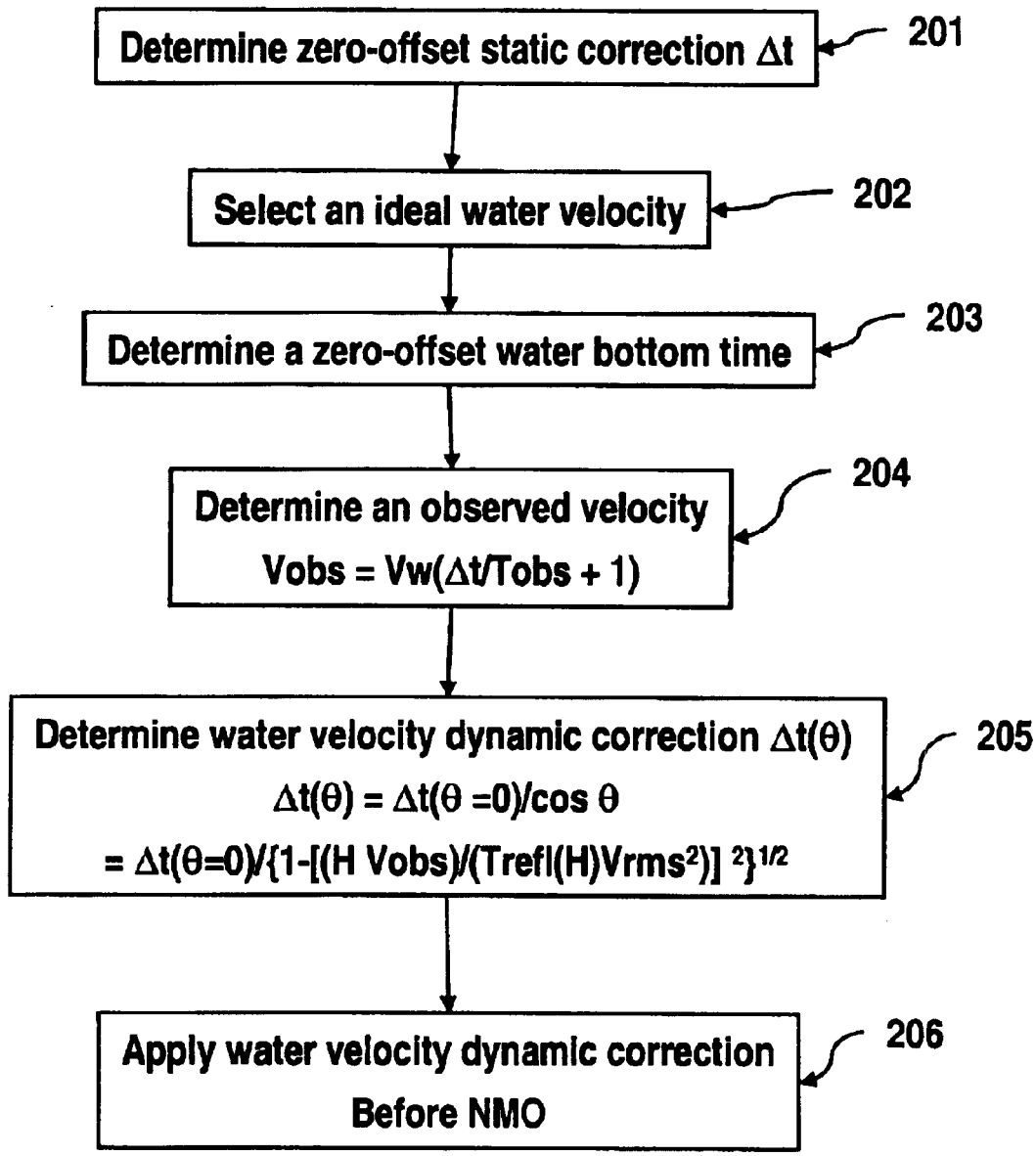
FIG. 6 illustrates another processing flowchart of the present invention.

FIG. 6 illustrates an alternate embodiment of the invention. A zero-offset static correction, $\Delta t$, is determined 201. A vertical static correction, $\Delta t$, may be defined that is the difference between an observed time to a water bottom and an ideal time to a water bottom determined using a selected ideal velocity. An ideal water velocity $V_w$ is selected 202. A zero-offset water bottom time is selected 203. The zero-offset water bottom times are available, or equivalently, the water velocities are assumed known. The timing errors and water velocities are related by equation 5 above. At 204, an observed velocity $V_{obs}$ is determined. Using this information, a water velocity dynamic correction is determined 205, and may be applied to the seismic data prior to NMO 206.

Persons skilled in the art will understand that the method described herein may be practiced as disclosed, including but not limited to the embodiments described. Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method of seismic data processing to correct for variable water velocities, the method comprising:
   (a) determining an observed velocity from velocity analysis of a seismic gather and selecting a constant water velocity;
   (b) determining a dynamic vertical time correction using said observed velocity and said constant water velocity; and
   (c) applying said dynamic vertical time correction to seismic data before normal moveout.

2. The method of claim 1 wherein determining an observed velocity further comprises determining $V_{obs}$ from $V_{obs}=V_w(\Delta t/T_{obs}+1)$.

3. The method of claim 1 wherein determining said vertical time correction further comprises determining a time-dependent and offset-dependent correction for at least one sample of the seismic data.

4. The method of claim 1 wherein said vertical time correction is of the form $\Delta t(\theta)=T_{obs}(V_{obs}/V_w-1)/\{1-[HV_{obs}/(T_{refl}(H)V_{rms}^2)]^2\}^{1/2}$ were $V_3$ is a selected constant water velocity.

5. A method for determining a water velocity correction for seismic data, the method comprising:
   (a) determining a zero-offset static correction, $\Delta t$, for the seismic data that is the difference between an observed time to a water bottom and a constant time to a water bottom determined using a selected ideal constant velocity;
   (b) selecting said constant water velocity, $V_w$ for the seismic data;
   (c) determining a zero-offset water bottom time for the seismic data;
   (d) determining an observed velocity, $V_{obs}$, for the seismic data; and
   (e) determining a water velocity dynamic correction.

6. The method of claim 5, wherein determining said water velocity time correction further comprises determining a time-dependent and offset-dependent correction for at least one sample of the seismic data.

7. The method of claim 5, wherein said water velocity dynamic correction is of the form $\Delta t(\theta)=T_{obs}(V_{obs}/V_w-1)/\{1-[HV_{obs}/(T_{refl}(H)V_{rms}^2)]^2\}^{1/2}$.

8. The method of claim 5 wherein said water velocity dynamic correction is determined for at least one source-receiver offset.

9. The method of claim 5 wherein deriving said water velocity dynamic correction further comprises determining at least one angle of seismic data raypaths for at least one source-receiver offset.

10. The method of claim 5 wherein determining an angle of seismic raypaths through the water uses velocities from at least one of the list consisting of: i) normal moveout velocities $V_{rms}$, ii) observed velocities $V_{obs}$, and iii) constant velocities $V_w$.

11. The method of claim 5 wherein determining said water velocity dynamic correction further comprises determining at least one seismic raypath through the water using velocities from at least one of the list consisting of: i) normal moveout velocities $V_{rms}$, ii) observed velocities $V_{obs}$, and iii) constant velocities $V_w$.

12. The method of claim 11 wherein deriving said seismic raypaths further comprises determining raypaths between a water surface and a water bottom, said water bottom defined by using at least one of the group consisting of i) $T_w$, ii) $T_{obs}$ and iii) an arbitrary water bottom model.

13. The method of claim 5 wherein deriving said water velocity dynamic correction further comprises determining $V_{obs}$ from $V_{obs}=V_w(\Delta t/T_{obs}+1)$.

14. The method of claim 5 wherein deriving said water velocity dynamic correction further comprises determining $V_{obs}$, from velocity analysis of a seismic gather.

15. A method of seismic data processing the method comprising:
   (a) determining a zero-offset static correction, $\Delta t$, for the seismic data that is the difference between an observed time to a water bottom and a constant time to a water bottom determined using a selected constant velocity;
   (b) selecting said constant water velocity, $V_w$, for the seismic data;
   (c) determining a zero-offset water bottom time for the seismic data;
   (d) determining an observed velocity, $V_{obs}$, for the seismic data;
   (e) determining a water velocity dynamic correction; and
   (f) applying said water velocity dynamic correction to seismic data.

16. The method of claim 15 wherein said water velocity dynamic correction is substantially of the form $$\Delta t(\theta)=T_{obs}(V_{obs}/V_w-1)/\{1-[HV_{obs}/(T_{refl}(H)V_{rms}^2)]^2\}^{1/2}.$$

17. The method of claim 15 wherein determining an observed velocity, $V_{obs}$, is of the form $V_{obs}=V_w(\Delta t/T_{obs}+1)$.

18. The method of claim 15 wherein said water velocity dynamic correction is determined for at least one source-receiver offset.

19. The method of claim 15 wherein determining said water velocity dynamic correction further comprises determining at least one seismic raypath through the water using velocities from at least one of the list consisting of: i) normal moveout velocities $V_{rms}$, ii) observed velocities $V_{obs}$, and iii) constant velocities $V_w$.

20. The method of claim 19 wherein deriving said seismic raypaths further comprises determining raypaths between seismic receivers and a water bottom defined by at least one of the group consisting of i) $T_w$, ii) $T_{obs}$ and iii) an arbitrary water bottom model.

21. The method of claim 15 wherein deriving said water velocity dynamic correction further comprises determining $V_{obs}$ from $V_{obs}=V_w(\Delta t/T_{obs}+1)$.

22. The method of claim 15 wherein deriving said water velocity dynamic correction further comprises determining $V_{obs}$ from velocity analysis of a seismic gather.

23. A method of seismic data processing to correct for variable water velocities, the method comprising:

(a) determining an observed velocity from velocity analysis of a seismic gather and selecting a constant water velocity;

(b) determining an angle dependent time correction using said observed velocity and said constant water velocity; and (c) applying said angle dependent time correction to seismic data before normal moveout.

24. The method of claim 23 wherein determining said observed velocity further comprises determining $V_{obs}$ from $V_{obs}=V_w(\Delta t/T_{obs}+1)$.

25. The method of claim 23 wherein determining said angle dependent time correction further comprises determining a time-dependent and offset-dependent correction for at least one sample of the seismic data.

26. The method of claim 23 wherein said vertical time correction $\Delta t$, is of the form $\Delta t(\theta)=T_{obs}(V_{obs}/V_w-1)/\{1-[HV_{obs}/(T_{refl}(H)V_{rms}^2)]^2\}^{1/2}$ where $V_w$ is a selected constant velocity.

* * * * *

UNITED STATES PATENT AND TRADEMARK OFFICE
CERTIFICATE OF CORRECTION

PATENT NO.     : 6,799,118 B2
DATED          : September 28, 2004
INVENTOR(S)    : Scott MacKay It is certified that error appears in the above-identified patent and that said Letters Patent is hereby corrected as shown below:

<u>Column 7,</u>
Line 59, delete "were" and insert -- where --; delete "$V_3$" and insert -- $V_w$ --.
Line 66, delete "ideal".

Signed and Sealed this

Fourteenth Day of March, 2006

JON W. DUDAS
*Director of the United States Patent and Trademark Office*